A. B. Latta,
Pipe Coupling.
Nº 8,801.  Patented Mar. 16, 1852.
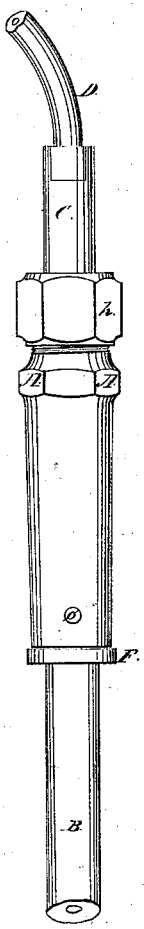
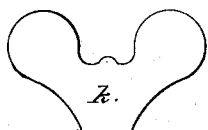
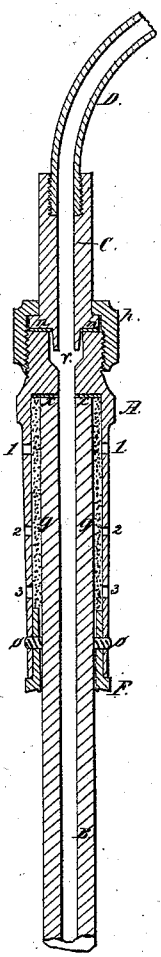
Fig. 1.
Fig. 4.
Fig. 2.
Fig. 3.

UNITED STATES PATENT OFFICE.

A. B. LATTA, OF CINCINNATI, OHIO.

JOINT AROUND GLASS TUBES FOR PHILOSOPHICAL APPARATUS.

Specification of Letters Patent No. 8,801, dated March 16, 1852.

*To all whom it may concern:*

Be it known that I, A. B. LATTA, of Cincinnati, in the county of Hamilton and State of Ohio, have invented a new Improved Mode of Making Joints Around Glass Tubes for Philosophical Purposes, &c.; and I do hereby declare that the following is a full and exact description thereof, reference being had to the accompanying drawings and to the letters of reference marked thereon.

Figure 1 is a sectional view of the joint in the state of being made, around the glass tube B and in the barrel A A. Fig. 2 is a sectional view of the joint after it is made complete, and secured in its place. Fig. 3, is a cross section of the tube barrel and packing space. Fig. 4 is a side elevation of the external part of the barrel with its attachments.

Similar letters refer to corresponding parts of the apparatus in each drawing.

The nature of my invention consists in making joints at the end of glass tubes by means of the friction of the packing material wrapped around the tube, which forces the end of the glass tube against the place designed and thereby forming a joint, together with the manner of allowing an evaporation from the packing of a liquid it is saturated with.

Similar letters and figures refer to corresponding parts of the improved joint.

To enable others skilled in the art to make and use my invention I will proceed to describe its construction and operation.

Fig. 1—A, A, is a barrel made of brass or other metal furnished with a screw at one end to make a common union joint at $b$, which secures the flange $c$ in which the copper pipe D is secured, as may be seen in Fig. 2. The other end of the barrel A A is reamed or bored out, and the bottom of the bore is made square or at right angles with the side of the bore at $x$ $x$, so as when the glass tube B is placed into the bore it will form a joint at $x$ $x$ by placing an india rubber gasket at the end of the tube B at $x$ $x$. Before the tube B is put in the bore there are three or four rounds of cotton $g$ $g$, soaked in a solution of red lead and varnish, wrapped around the end of the tube as firm as it can be handily drawn with the hand. The tube B is put into the bore, then, and the barrel A A then is put in the screw clamp $m$, $m$, $m$, the upper end of which is furnished with screw $k$ that screws upon the cap $s$, and the lower part of the clamp $m$, $m$, $m$, is furnished with two hooks or latches one on each side of which projects from the main stock of the clamp. The hooks or latches of the clamp are placed under the stuffing box F and by means of turning the screw $k$ in the upper part of the clamp the stuffing box F is forced into the bore of the barrel A, A, and forces the packing $g$ $g$ before it. At the same time the friction of the packing or cotton around the tube B forces the end of the tube against the bottom of the bore so as it will make a joint at $x$ $x$ by placing an india rubber gasket between the end of the tube and the bottom of the bore as before mentioned.

1, 1, 2, 2, 3, 3, are holes drilled in the barrel A A so as to allow the liquid matter from the packing to evaporate and become hard, after which the holes are soldered up with common soft solder.

The stuffing box F is held to its place after being screwed or forced up by means of the pins $o$, $o$, on opposite sides of the barrel A A as may be seen in Figs. 1, 2, and 4. The flange C that is screwed on or connected with the barrel A A by means of nut $h$ has a tubular projection at its lower part at $r$ which prevents the india rubber gasket, $n$, $n$, from forcing out and stopping the opening in the pipe D or flange C where it is connected with the barrel A A by the means of nut $h$ as before mentioned.

1. I claim the method used for promoting the drying or evaporating of the liquid matter from the packing by drilling the holes 1, 1, 2, 2, and 3, 3, in the barrel A A, the said holes being afterward filled with solder.

2. I claim the method of making the joint $x$ $x$ at the end of the tube which is effected by the friction of the packing around the tube B which forces the end of the tube against the bottom of the bore and produces a joint when the stuffing box F is forced to its place as herein mentioned and set forth.

A. B. LATTA.

Witnesses:
EBENEZER HARRISON,
MARTIN BENSON.